(12) United States Patent
Michael et al.

(10) Patent No.: US 6,516,924 B1
(45) Date of Patent: Feb. 11, 2003

(54) VEHICLE BRAKE SYSTEM

(75) Inventors: Jeffrey L. Michael, St. Joseph, MI (US); Brian P. Dennis, Dowagiac, MI (US); Theodore E. Hornus, Coloma, MI (US); Brett A. Starr, Michigan City, IN (US); Michael J. Murphy, Stevensville, MI (US)

(73) Assignee: Ausco Products, Inc., Benton Harbor, MI (US)

( * ) Notice: Subject to any disclaimer, the term of this patent is extended or adjusted under 35 U.S.C. 154(b) by 0 days.

(21) Appl. No.: 09/591,836

(22) Filed: Jun. 12, 2000

(51) Int. Cl.⁷ ............................................... F16D 55/36
(52) U.S. Cl. ..................... 188/71.5; 188/170; 188/71.6; 192/70.12
(58) Field of Search ................................ 188/71.5, 71.6, 188/72.4, 170; 192/85 AA, 70.11, 70.12

(56) References Cited

U.S. PATENT DOCUMENTS

| | | | | |
|---|---|---|---|---|
| 3,680,666 A | * | 8/1972 | Sommer .................... | 188/71.5 |
| 3,927,737 A | * | 12/1975 | Prillinger et al. .......... | 188/71.5 |
| 4,146,116 A | * | 3/1979 | Cumming .................. | 188/71.5 |
| 4,280,609 A | * | 7/1981 | Cruise ...................... | 192/70.12 |
| 4,358,001 A | * | 11/1982 | Iverson ...................... | 188/71.5 |
| 4,491,202 A | * | 1/1985 | Schmitt ...................... | 188/71.5 |
| 4,615,418 A | * | 10/1986 | Atwell ....................... | 188/71.5 |
| 4,863,001 A | * | 9/1989 | Edmisten ................... | 188/71.5 |
| 4,890,699 A | * | 1/1990 | Megginson et al. ....... | 188/71.5 |
| 4,917,002 A | * | 4/1990 | Pociask .................. | 192/85 AA |
| 5,050,939 A | * | 9/1991 | Middelhoven et al. ..... | 188/71.5 |
| 5,174,420 A | * | 12/1992 | DeWald et al. ............ | 188/71.5 |
| 5,466,052 A | * | 11/1995 | Tietje ........................ | 188/71.5 |
| 5,701,976 A | * | 12/1997 | Kumagai et al. .......... | 188/71.5 |
| 6,098,771 A | * | 8/2000 | Vu .......................... | 192/85 AA |

OTHER PUBLICATIONS

Drawing of a brake being sold by Ausco Products, Inc., Benton Harbor, Michigan (undated).
Drawing No. 32470 of Auto Specialties Mfg. Co., St. Joseph, Michigan (dated Jun. 7, 1978).

* cited by examiner

*Primary Examiner*—Jack Lavinder
*Assistant Examiner*—Robert A. Siconolfi
(74) *Attorney, Agent, or Firm*—Renner, Kenner, Greive, Bobak, Taylor & Weber (57) ABSTRACT

A brake (10) for a wheel of a vehicle includes a housing (11) having one end closed by an end plate (12) which is adapted to be attached to the vehicle. An axle assembly (26) is received in the housing (11) and is adapted to be attached to the wheel for rotation therewith. The axle assembly includes a drive surface (33) which carries a shaft sleeve (48) having a splined outer surface (52). A disc brake assembly (55) is immersed in a fluid in the housing (11) and includes a plurality of rotatable discs (54) carried by the splined surface (52) and a plurality of stationary discs (56) which alternate with the rotatable discs (54) to form the disc brake assembly (55). Each of the stationary discs (56) has ears (58A, 58B) which are received in brackets (59) carried by the housing (11). A piston ring (62) is moveable to cause the stationary discs (56) to engage the rotatable discs (54) to apply a braking torque to the wheel. Return springs (71) act on ears (58A) of the end stationary disc (56A) and thus on the piston ring (62) to separate the discs (54, 56) upon removal of the braking torque.

25 Claims, 7 Drawing Sheets

VEHICLE BRAKE SYSTEM

TECHNICAL FIELD

This invention relates to a brake especially adapted for use with all-terrain vehicles or over-the-road towed vehicles, such as boat trailers or the like. More specifically, this invention relates to such a brake wherein the components thereof are sealed from the environment.

BACKGROUND ART

Over-the-road trailers and all-terrain vehicles are normally provided with conventional single disc caliper brakes with, at times, being provided with drum brakes. As such, the components of these brakes are exposed to the atmosphere which readily results in the corrosion of many of their component parts. Such is particularly true in the case of boat trailers where the brakes are frequently exposed to water, even salt water. Such corrosion not only affects brake wear, efficiency, and consistency, but also will ultimately lead to the need to replace many critical, and expensive, brake components. Moreover, heat dissipation problems with these prior art brakes can affect brake performance and potentially lead to premature failure.

When a brake is sealed to the atmosphere, usually the components thereof are immersed in oil for cooling purposes. However, the oil must be sealed from the brake fluid used to operate the brakes of over-the-road trailers or all-terrain vehicles, which presents a problem of seal compatibility; that is, the seal material used for petroleum-based oil is incompatible with the brake fluid or vice-versa. The solution of the prior art to this problem is to provide two seals with an air gap between them which allows each fluid to interact only with the seal with which it is compatible. Such undesirably adds to the size and the cost of the brake.

In addition to the foregoing problems, the prior art brakes are difficult and time consuming to install and/or replace. With respect to trailers, first, a spindle must be welded onto the axle of the trailer and bearings must be pressed onto the spindle. Then a hub and disc, or hub and drum, assembly, with bearing races formed therein, must be attached to the spindle. Then a bracket must be mounted on the frame of the trailer and a caliper attached to the bracket adjacent to the disc. The wheel is then mounted to the hub. With respect to all-terrain vehicles, the caliper and wheel assembly must be mounted to the strut on the front of the vehicle. First, bearings must be installed into bores cut into the strut itself. Then, a shaft is installed into the bearings. The shaft is splined on the outside to accept the gear tooth configuration of a hub which mounts both the wheel and the rotor for the caliper. The caliper is mounted to a machined face of the strut by a separate bracket which allows the caliper to float on the disc.

In view of these problems, it is evident that the need exists for a modular brake which is easy to install and which will isolate all of the components of the brake from the deleterious effects of its environment.

DISCLOSURE OF THE INVENTION

It is thus an object of the present invention to provide a brake for a trailer or all-terrain vehicle which is modular in nature and which totally houses the brake components to seal them from the environment.

It is another object of the present invention to provide a brake, as above, which is easy to install.

It is a further object of the present invention to provide a brake, as above, in which the brake components are protected from corrosion.

It is an additional object of the present invention to provide a brake, as above, which provides consistent braking forces for the vehicle.

It is yet another object of the present invention to provide a brake, as above, which provides superior heat dissipation and otherwise prevents premature failure.

It is a still further object of the present invention to provide a brake, as above, in which the components thereof are immersed in oil and a single seal can be utilized between the activating brake fluid and the oil.

It is still a further object of the present invention to provide a brake, as above, in which the components will not disadvantageously wear, thereby providing a brake which will not normally need replacement or service.

These and other objects of the present invention, as well as the advantages thereof over existing prior art vehicle brakes, which will become apparent from the description to follow, are accomplished by the improvements hereinafter described and claimed.

In general, a brake for a wheel of a vehicle made in accordance with the present invention includes a housing, and an axle assembly adapted to be attached to the wheel of the vehicle for rotation therewith. A plurality of stationary discs are positioned in the housing. A plurality of rotatable discs are carried by the axle assembly and are positioned to be engaged by the stationary discs. At least one bracket is carried by the housing. Each stationary disc has at least one ear which is received in the bracket. A piston is moveable to cause the stationary discs to engage the rotatable discs to apply a braking torque to the wheel.

In accordance with another aspect of the present invention, the axle assembly includes drive surfaces which engage a shaft sleeve having a splined outer surface. The plurality of rotatable discs are carried by the splined outer surfaces.

In yet another aspect of the present invention, a first fluid is provided in the housing. The piston includes a ring and a rib and is moveable by a second fluid to cause the ring to engage a stationary disc to cause the stationary discs to engage the rotatable discs to apply a braking torque to the wheel. A seal is provided adjacent to the rib to prevent the first fluid from communicating with the second fluid.

In a further aspect of the present invention, the housing has open ends, and a plate is attached to one end of the housing and is adapted to be attached to the vehicle. A seal is provided between the plate and the housing. The axle assembly is received in the other end of the housing and a seal is provided between the housing and the axle assembly.

A preferred exemplary vehicle brake incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
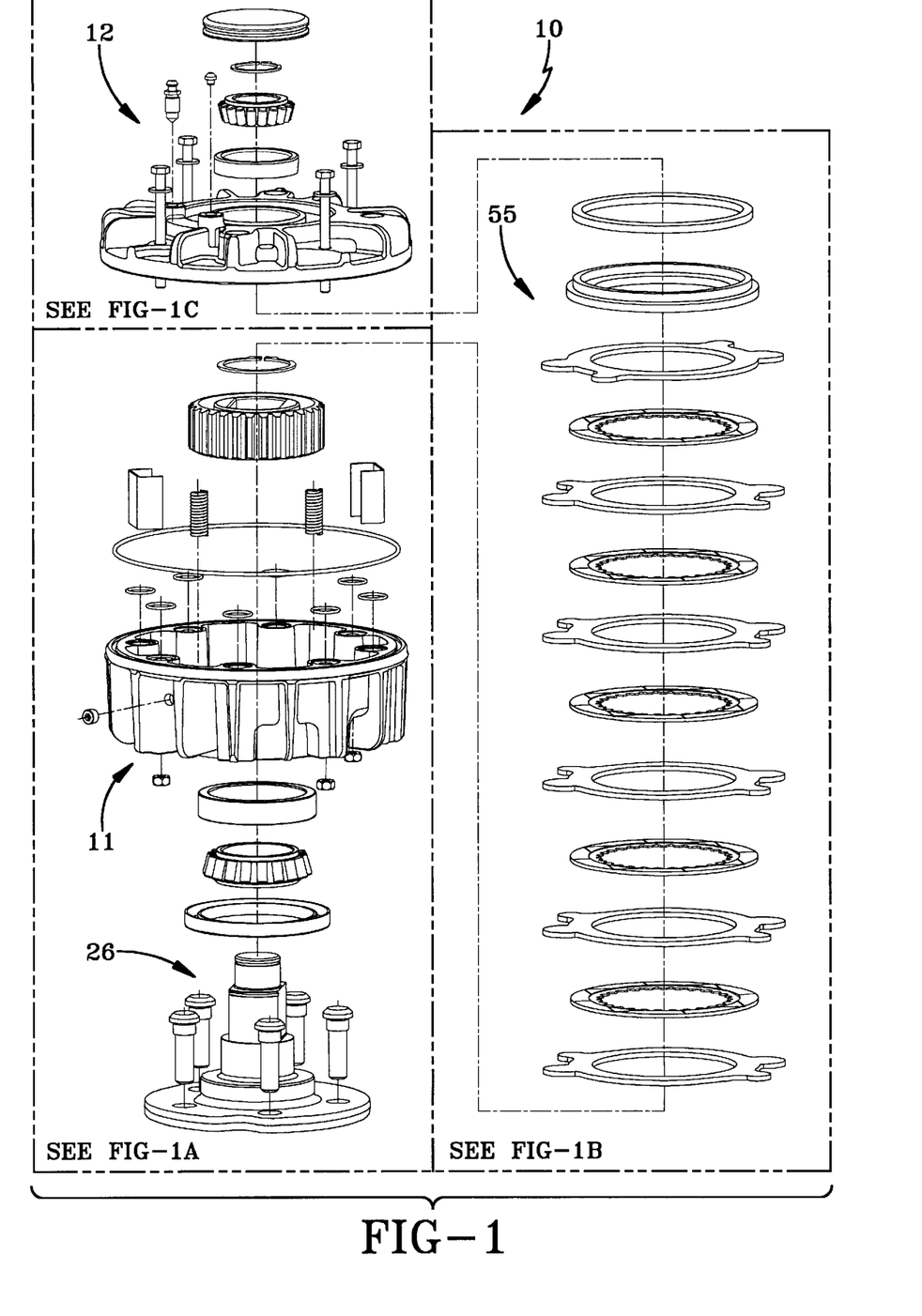
FIG. 1 is an overall exploded view showing the components of a brake made in accordance with the present invention.

A brake made in accordance with the present invention is indicated generally by the numeral 10 and is shown with its components exploded in FIG. 1 and assembled in FIGS. 2–5. Brake 10 includes a main housing, generally indicated by the numeral 11, which is generally cylindrical in configuration having open ends. One end of housing 11 is closed by an end plate assembly, generally indicated by the numeral 12, which is attached to housing 11 by a plurality of bolts 13 having washers 14 positioned between the heads 15 of bolts 13 and end plate 12. Bolts 13 are received through circumferentially spaced bores 16 formed in housing 11 and are engaged by nuts 17 which are, in turn, received in hex-shaped apertures 18 (FIG. 4) formed in the other end of housing 11. As a result, bolts 13 may be readily tightened without the use of extra tools as apertures 18 prevent nuts 17 from turning. An o-ring 19 may be provided between the mating surfaces of housing 11 and plate 12, and a plurality of o-rings 20 may be provided around bolts 13 at the mating surfaces of housing 11 and end plate 12. Housing 11 and end plate 12 are preferably formed of die cast aluminum, and their external surfaces are preferably provided with fins 21 and 22, respectively. Fins 21 and 22 act to dissipate any heat generated by the components of brake 10.

When so assembled, another set of circumferentially spaced bores 23 in housing 11 are aligned with similar bores 24 in end plate 12, with o-rings 25 being positionable therebetween. As such, brake 10 may be readily attached to a vehicle, such as a trailer or all-terrain vehicle by inserting bolts (not shown) through aligned bores 23 and 24 to be received by the frame or other rigid structure of the vehicle.

Figure 1A:
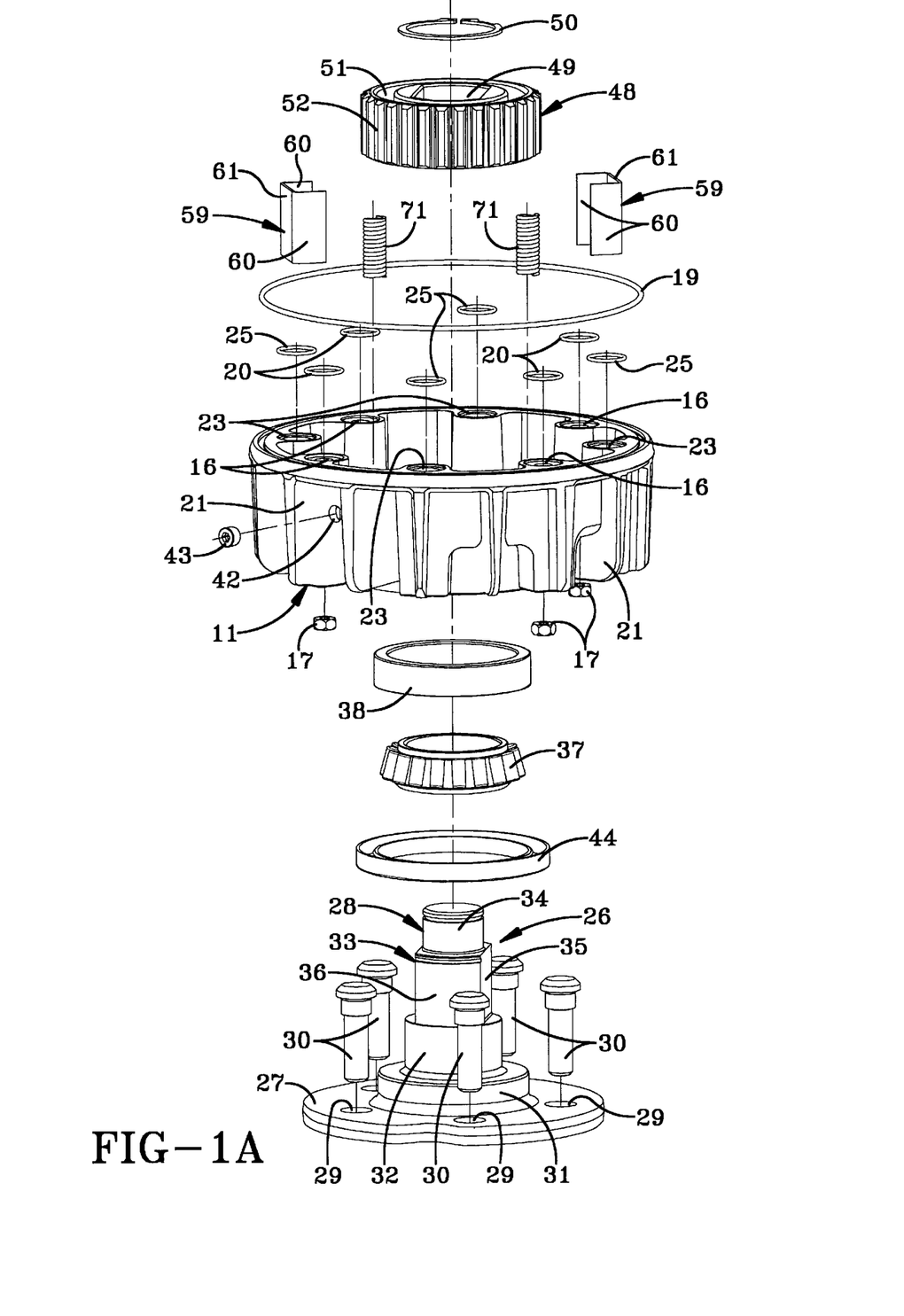
FIG. 1A is an enlarged exploded view showing some of the components shown in FIG. 1.
Figure 3:
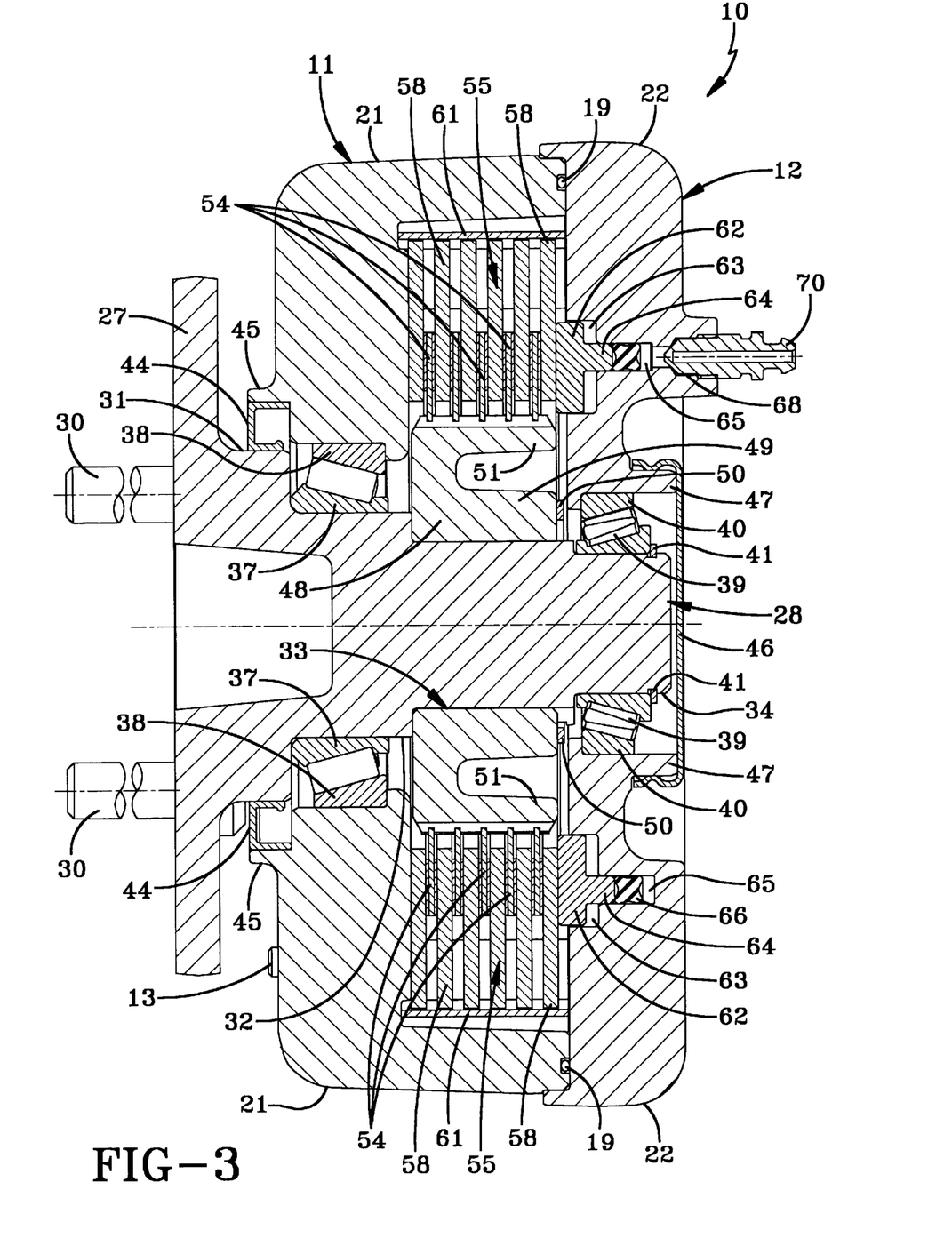
FIG. 3 is a sectional view taken substantially along line 3—3 of FIG. 2.
Figure 4:
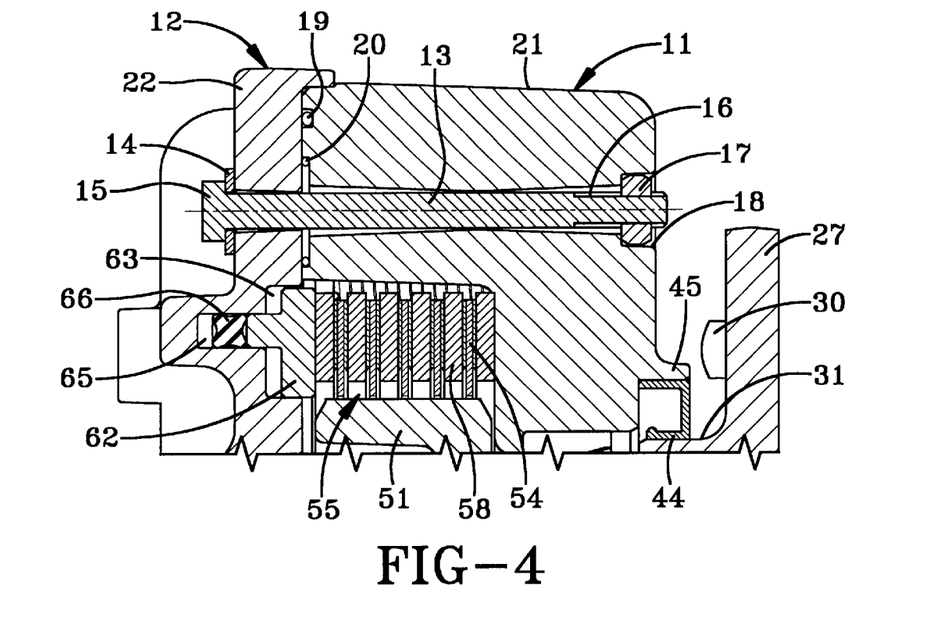
FIG. 4 is a sectional view taken substantially along line 4—4 of FIG. 2.

An axle plate and shaft assembly is best shown in FIGS. 1A and 3 and is generally indicated by the numeral 26. Assembly 26 includes a generally circular plate 27 integrally formed with an axle shaft, generally indicated by the numeral 28, which extends outwardly from plate 27. Plate 27 is provided with a plurality of apertures 29 therethrough which receive wheel studs 30 to which the wheel of the vehicle may be attached in a conventional fashion.

Shaft 28 is preferably formed of tempered steel and includes four distinct outer surfaces as it extends outwardly from plate 27. Adjacent to plate 27, shaft 28 includes a generally circular sealing surface 31. Adjacent to sealing surface 31, a first circular bearing surface 32 is formed which is of a smaller diameter than sealing surface 31. A drive surface, generally indicated by the numeral 33, is formed adjacent to first bearing surface 31, and a second bearing surface 34 is formed at the end of drive surface 33 and constitutes the end of shaft 28. Drive surface 33 preferably has an external profile having two opposed flat surfaces 35 and two opposed arcuate surfaces 36.

As the wheels of the vehicle rotate, shaft 28 rotates within housing 11. To that end, a first set of bearings, including a bearing cone 37 and a bearing cup 38, is provided between first bearing surface 32 and housing 11, and a second set of bearings, including a bearing cone 39 and a bearing cup 40, is provided between second bearing surface 34 and housing 11. A retaining ring 41 is snap fit into a groove in shaft 28 to hold the bearings in place.

In order to lubricate the bearings and otherwise assist in the dissipation of heat, the inside of brake 10, that is, the area defined by housing 11 and end plate 12, is partially filled with a lubricating and corrosion-preventing oil. To that end, housing 11 can be provided with diametrically opposed ports 42 which can be utilized to fill oil into or drain oil from brake 10. Plugs 43 are provided to close ports 42 when brake 10 is in operation.

Since housing 11 is thus filled with oil, in addition to the o-ring 19 previously described, means must be provided to assure that it is totally sealed. Thus, a lip seal 44 is provided to seal the space between axle plate and shaft assembly 26 and housing 11. As best shown in FIG. 3, lip seal 44 is received between sealing surface 31 of axle shaft 28 and a circumferential boss 45 formed at the end of housing 11. At the other end of brake 10, an end cap 46, preferably formed of sheet metal, is press fit onto a circular lug 47 formed in end plate 12 thereby closing plate 12 over axle shaft 28.

Brake 10 also includes a shaft sleeve generally indicated by the numeral 48. Shaft sleeve 48 includes an inner hub 49 shaped to match the configuration of drive surface 33 of shaft 28. Thus, sleeve 48 fits over drive surface 33 and thereby rotates with shaft 28. A retaining snap ring 50 fits within a groove in shaft 28 and axially maintains sleeve 48 on drive surface 33.

Figure 1B:
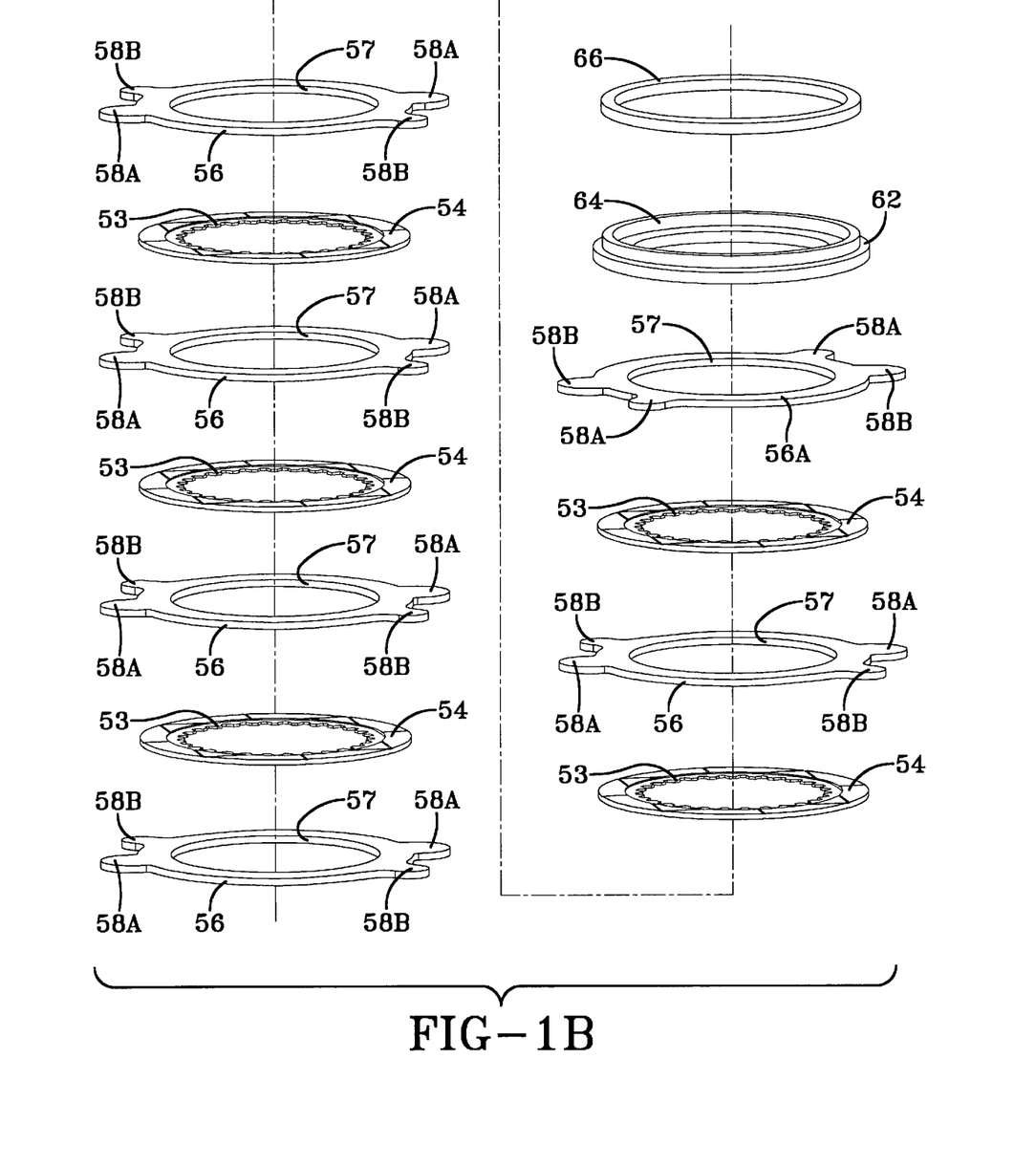
FIG. 1B is an enlarged exploded view showing some of the components shown in FIG. 1.
Figure 1C:
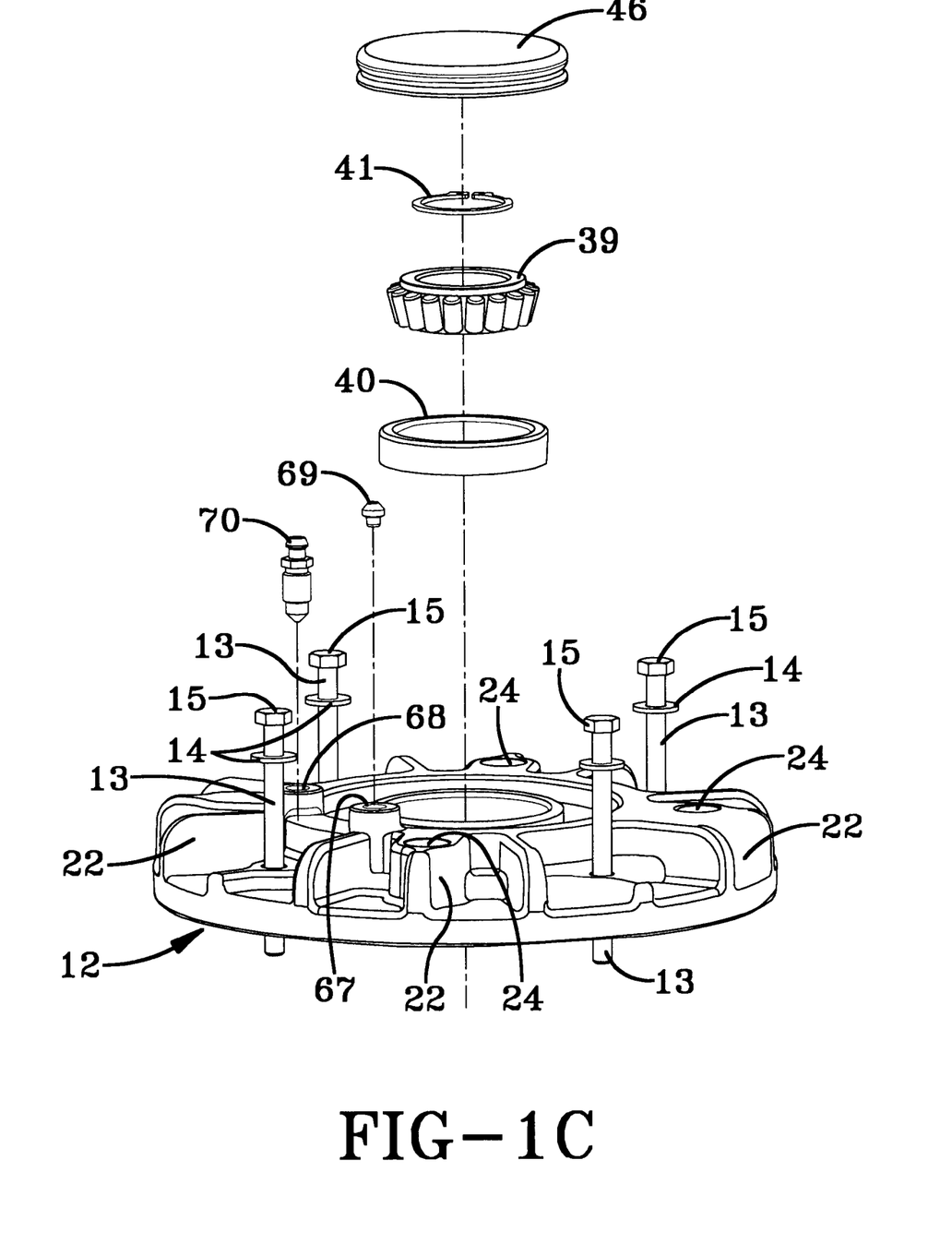
FIG. 1C is an enlarged exploded view showing some of the components shown in FIG. 1.
Figure 2:
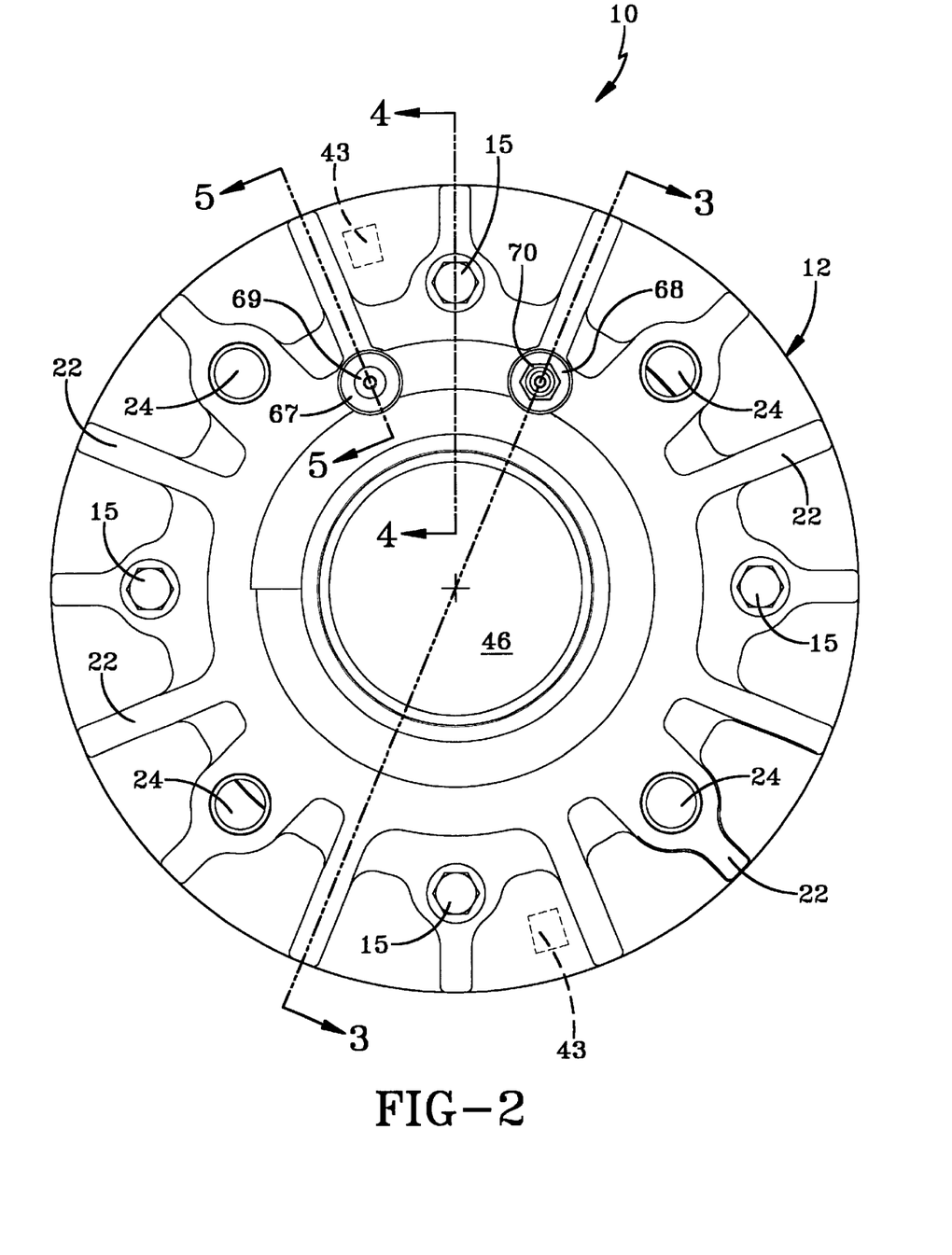
FIG. 2 is an end elevational view of the brake.

Shaft sleeve 48 also includes a circular outer portion 51 which is radially spaced from hub 49. The radially outer surface 52 of portion 51 is splined to engage a radially inner splined surface 53 of a plurality of rotatable brake discs 54 which are part of a disc brake assembly generally indicated by the numeral 55. Disc brake assembly 55 also includes a plurality of stationary discs 56 which have a radially inner surface 57 which fits over, but is not engage by, splined surface 52 of shaft sleeve 48. As best shown in FIG. 1B, rotatable discs 54 and stationary discs 56 alternate to form the stack which constitutes disc brake assembly 55, there being six stationary discs 56 shown, with five rotatable discs 54 being positioned therebetween. As is known in the art, when these discs are caused to engage each other, a braking torque is applied to axle shaft 28 as will be more fully hereinafter described.

Stationary discs 56 are provided with diametrically opposed pairs of ears 58A and 58B extending outwardly therefrom, with ears 58A being diametrically opposed to each other and ears 58B being circumferentially spaced from ears 58A and diametrically opposed to each other. As will hereinafter become evident, discs 56 could be formed with only one set of diametrically opposed ears, that is, either ears 58A or ears 58B, but for ease of manufacturing all discs 56 alike, ear pairs 58A and 58B are formed. This is because, as shown in FIG. 1B, one disc identified as disc 56A (the top one in FIG. 1B) merely needs to be flipped over so that its ears 58B are aligned with the ears 58A of the other discs 56, and the ear 58A of disc 56A shown in FIG. 1B is not aligned with any of the ears of the other five discs 56. As will also become evident, all six discs 56 thus require only single diametrically opposed ears, but one disc requires opposed pairs of ears. Thus, manufacturing all discs with pairs of opposed ears is most efficient.

The opposed aligned ears 58 of all discs are received in diametrically opposed brackets, generally indicated by the numeral 59, which are fixedly positioned within housing 11. Brackets 59 are preferably made of steel and are unshaped in configuration having opposed arms 60 spaced by a base member 61. Thus, opposed, aligned ears 58 are received between arms 60 with their radially outer ends being adjacent to base member 61 as shown in FIG. 3.

An annular piston ring 62, preferably made of a phenolic material, is positioned for movement within an annular chamber 63 formed in end plate 12. An annular rib 64 extends from piston ring 62 into an annular groove 65 formed in end plate 12, groove 65 communicating with chamber 63. As a result, the piston ring 62 with its rib 64 are generally T-shaped in cross-section. Such advantageously provides a larger working surface at the face of ring 62 and a smaller surface of rib 64 to be sealed. To that end, a seal 66 is also positioned in groove 65 adjacent to rib 64. Seal 66 is preferably formed at least in part of a polytetrafluoroethylene material which is inert to the petroleum-based fluids within housing 11 and to the brake fluids applying pressure to piston ring 62. This brake fluid communicates with brake 10 through two ports 67 and 68 which are formed in end plate 12, ports 67 and 68 communicating with groove 65. A tube-inverted, flare insert 69 is receive in port 67 and is adapted to communicate with a hydraulic brake line (not shown). A bleeder valve 70 is received in port 68. Alternatively, bleeder valve 70 may be received in port 67 and insert 69 received in port 68.

When the vehicle is moving over the road, brake discs 54 are rotating freely between stationary brake discs 56. However, when the operator of the vehicle having a brake 10 applies the brakes, hydraulic fluid under pressure is received through flare insert 69 into annular groove 65. Any trapped air in groove 65 may be expelled through bleeder valve 70 at brake installation. The fluid under pressure is sealed from chamber 63 and the other oil-immersed components in housing 11 by seal 66, and the fluid acts on seal 66 which in turn acts on piston ring 62 to clamp discs 54 and 56 to each other between piston 62 and housing 11, which is the condition shown in FIGS. 3–5. In this condition, friction between the rotating discs 54 and the stationary discs 56 applies a torque to the stationary discs urging them to rotate. However, because ears 58 are confined by brackets 59, stationary discs 56 will not rotate and a braking torque is applied to axle shaft 28. It should be noted that if the torque were reacted directly against the housing 11, as opposed to brackets 59, housing 11 could be damaged because of its aluminum composition. Such could result in ultimate brake failure. However, the steel brackets 59 cannot be so damaged and, as a result, the torque is reacted against the housing 11 which is protected by brackets 59. Any heat which may be generated by the friction and motion of the engaged discs 54 and 56 is dissipated through the oil bath and out through housing 11 and end cap 12 with the assistance of fins 21 and 22. The oil bath also prevents wearing of discs 54 and 56.

Figure 5:
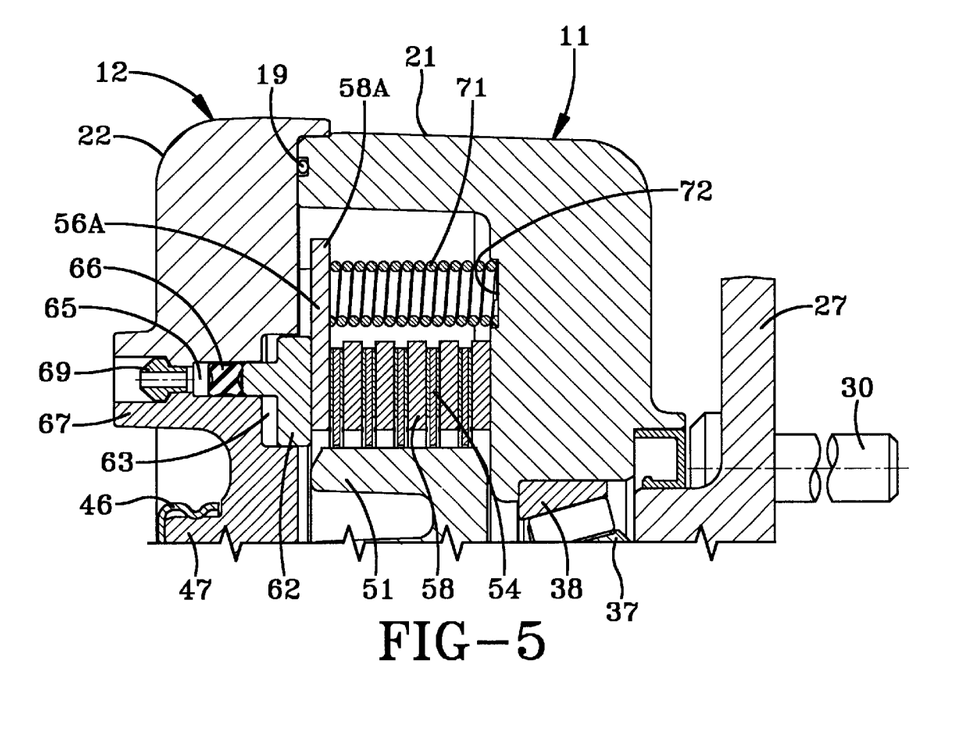
FIG. 5 is a sectional view taken substantially along line 5—5 of FIG. 2.

When the operator of the vehicle releases the brake, rotating discs 54 will again be free to rotate since hydraulic pressure will no longer be acting on piston ring 62. However, to assure such release, it may be desirable to provide opposed return springs 71 which, as shown in FIG. 5, are positioned between a notch retainer 72 formed in housing 11 and ears 58A of the end stationary disc 56A. As such, when the hydraulic pressure is released, springs 71 will act on brake assembly 55 to assist in moving piston ring 62 away from the end disc 56 to allow discs 54 and 56 to separate to relieve frictional engagement.

In view of the foregoing, it should thus be evident that a brake as described herein accomplishes the objects of the present invention and otherwise substantially improves the art.

What is claimed is:

1. A brake for a wheel of a vehicle comprising an enclosed housing, an axle assembly extending into said housing and adapted to be attached to the wheel of the vehicle for rotation therewith, a plurality of stationary discs in said housing, a plurality of rotatable discs carried by said axle assembly, said rotatable discs being positioned to be engaged by said stationary discs, at least one stationary bracket carried by said housing, each said stationary disc having at least one ear received in said bracket, and a piston, said piston being moveable to cause said stationary discs to engage said rotatable discs whereby said ear engages said bracket to transmit forces to said housing to apply a braking torque to the wheel.

2. A brake according to claim 1 wherein each said stationary disc includes a pair of opposed ears, there being a pair of said brackets to receive said opposed ears.

3. A brake according to claim 2 wherein at least one of said stationary discs includes a second pair of opposed ears, said second pair of opposed ears being circumferentially spaced from said pair of opposed ears.

4. A brake according to claim 3 further comprising a spring positioned between said housing and each of said second pair of opposed ears, each said spring acting against said piston to cause said stationary discs to disengage said rotatable discs.

5. A brake according to claim 1 wherein said bracket is generally unshaped having arms which confine said ear.

6. A brake according to claim 1 wherein said axle assembly includes drive surfaces, and further comprising a shaft sleeve engaged by said drive surfaces and having a splined outer surface, said rotatable discs being carried by said splined outer surface.

7. A brake according to claim 6 wherein said piston includes a ring and a rib, and further comprising a first fluid in said housing, said piston being moveable by a second fluid to cause said ring to engage a said stationary disc, and a seal adjacent to said rib to prevent said first fluid from communicating with said second fluid.

8. A brake according to claim 7 wherein said housing includes a member having open ends, said axle assembly being received in one end of said member, and further comprising a plate attached to the other end of said member and adapted to be attached to the vehicle, a seal between said plate and said member, and a seal between said member and said axle assembly.

9. A brake according to claim 6 wherein said housing includes a member having open ends, said axle assembly being received in one end of said member, and further comprising a plate attached to the other end of said member and adapted to be attached to the vehicle, a seal between said plate and said member, a seal between said member and said axle assembly, and a fluid in said housing.

10. A brake according to claim 1 wherein said piston includes a ring and a rib, and further comprising a first fluid in said housing, said piston being moveable by a second fluid to cause said ring to engage a said stationary disc, and a seal adjacent to said rib to prevent said first fluid from communicating with said second fluid.

11. A brake according to claim 1 wherein said housing includes a member having open ends, said axle assembly being received in one end of said member, and further comprising a plate attached to the other end of said member and adapted to be attached to the vehicle, a seal between said plate and said member, a seal between said member and said axle assembly, and a fluid in said housing.

12. A brake for a wheel of a vehicle comprising an enclosed housing, an axle assembly extending into said housing and adapted to be attached to the wheel of the vehicle for rotation therewith, said axle assembly having drive surfaces which form an external profile of said axle assembly having two opposed flat surfaces and two opposed arcuate surfaces, a shaft sleeve engaged by said drive surfaces, said shaft sleeve having a splined outer surface, a plurality of stationary discs in said housing, a plurality of rotatable discs carried by said splined outer surface, said rotatable discs being positioned to be engaged by said stationary discs, and a piston, said piston being moveable to cause said stationary discs to engage said rotatable discs to apply a braking torque to the wheel.

13. A brake according to claim 12 wherein said stationary discs are received over but are not engaged by said splined outer surface.

14. A brake according to claim 13 wherein a said rotatable disc is positioned between each pair of adjacent of said stationary discs.

15. A brake according to claim 12 wherein said piston includes a ring and a rib, and further comprising a first fluid in said housing, said piston being moveable by a second fluid to cause said ring to engage a said stationary disc, and a seal adjacent to said rib to prevent said first fluid from communicating with said second fluid.

16. A brake according to claim 15 wherein said housing includes a member having open ends, said axle assembly being received in one end of said member, and further comprising a plate attached to the other end of said member and adapted to be attached to the vehicle, a seal between said plate and said member, and a seal between said member and said axle assembly.

17. A brake according to claim 12 wherein said housing includes a member having open ends, said axle assembly being received in one end of said member, and further comprising a plate attached to the other end of said member and adapted to be attached to the vehicle, a seal between said plate and said member, a seal between said member and said axle assembly, and a fluid in said housing.

18. A brake for a wheel of a vehicle comprising a housing, an axle assembly adapted to be attached to the wheel of the vehicle for rotation therewith, a plurality of stationary discs in said housing, a plurality of rotatable discs carried by said axle assembly, said rotatable discs being positioned to be engaged by said stationary discs, a first fluid in said housing, a piston, said piston including a ring and a rib, said piston being moveable by a second fluid of a different composition than said first fluid to cause said ring to engage a said stationary disc to cause said stationary discs to engage said rotatable discs to apply a braking torque to the wheel, and a seal adjacent to said rib to prevent said first fluid from communicating with said second fluid, said seal including a material which is inert to the composition of both said first and second fluids.

19. A brake according to claim 18 wherein said rib extends outwardly from said ring to form said piston with a generally T-shaped cross-section.

20. A brake according to claim 19 wherein said ring provides a greater area of contact on said a said stationary disc than the area of said rib exposed to said seal.

21. A brake according to claim 18 wherein said housing includes a member having open ends, said axle assembly being received in one end of said member, and further comprising a plate attached to the other end of said member and adapted to be attached to the vehicle, a seal between said plate and said member, and a seal between said member and said axle assembly.

22. A brake for a wheel of a vehicle comprising a housing having open axial ends, an end plate attached to one axial end of said housing and adapted to be attached to the vehicle, a seal between said end plate and said housing, an axle assembly received in the other axial end of said housing and including a mounting plate closing the other end of said housing and adapted to be attached to the wheel for rotation therewith, said axle assembly including a shaft extending from said mounting plate and toward said end plate, first bearings between said shaft and said housing, second bearings between said shaft and said end plate, a seal between said housing and said mounting plate, a fluid in said housing, a disc brake assembly immersed in said fluid, and a piston adapted to activate said brake assembly to apply a braking torque to the wheel.

23. A brake for a wheel of a vehicle comprising a housing having open axial ends, an end plate attached to one axial end of said housing and adapted to be attached to the vehicle, a seal between said end plate and said housing, an axle assembly received in the other axial end of said housing and including a mounting plate closing the other end of said housing and adapted to be attached to the wheel for rotation therewith, said axle assembly including a shaft extending from said mounting plate and toward said end plate, said end plate including an end cap positioned adjacent to the end of said shaft, a seal between said housing and said mounting plate, a fluid in said housing, a disc brake assembly immersed in said fluid, and a piston adapted to activate said brake assembly to apply a braking torque to the wheel.

24. A brake according to claim 22 further comprising heat dissipating fins formed on the outside of said housing and on the outside of said end plate.

25. A brake for a wheel of a vehicle comprising a housing having open ends, a plate attached to one end of said housing and adapted to be attached to the vehicle, a seal between said plate and said housing, an axle assembly received in the other end of said housing and adapted to be attached to the wheel of the vehicle for rotation therewith, said axle assembly having drive surfaces, a shaft sleeve engaged by said drive surfaces, said shaft sleeve having a splined outer surface, a plurality of stationary discs in said housing, a plurality of rotatable discs carried by said splined outer surface, said rotatable discs being positioned to be engaged by said stationary discs, at least one bracket carried by said housing, each said stationary disc having at least one ear received in said bracket, a first fluid in said housing, a seal between said housing and said axle assembly, a piston, said piston including a ring and a rib, said piston being moveable by a second fluid to cause said ring to engage a said stationary disc to cause said stationary discs to engage said rotatable discs to apply a braking torque to the wheel, and a seal adjacent to said rib to prevent said first fluid from communicating with said second fluid.

* * * * *